United States Patent [19]

Tiszauer et al.

[11] Patent Number: 5,729,374
[45] Date of Patent: Mar. 17, 1998

[54] SPECKLE AVERAGING SYSTEM FOR LASER RASTER-SCAN IMAGE PROJECTION

[75] Inventors: Detlev H. Tiszauer, Tracy; Lloyd A. Hackel, Livermore, both of Calif.

[73] Assignee: The Regents of the University of California, Oakland, Calif.

[21] Appl. No.: 497,965

[22] Filed: Jul. 3, 1995

[51] Int. Cl.$^6$ .................................................. G02B 26/08
[52] U.S. Cl. ........................ 359/212; 359/220; 359/223; 359/226
[58] Field of Search .................................. 359/220, 226, 359/211–213, 223

[56] References Cited

U.S. PATENT DOCUMENTS 5,313,479  5/1994  Florence ..................................... 372/26

OTHER PUBLICATIONS

Leger et al., Real–time measurement of surface roughness by correlation of speckle patterns, Nov. 1976, vol. 66, No. 11, 1210–1217, J. OptSoc of Am.

Tsuruta et al., Formation and localization of holographically produced interference fringes, 1969, vol. 16, No. 6, 723–733, Optica Acta.

Leger et al., Optical Surface Roughness Determination Using Speckle Correlation Technique, Apr. 1975, vol. 14, No. 4, 872–877, Applied Optics.

Archbold et al., Displacement measurement from double-–exposure laser photographs, 1972, vol. 19, No. 4, 253–271 Optica Acta.

*Primary Examiner*—David C. Nelms
*Assistant Examiner*—John P. Cornely
*Attorney, Agent, or Firm*—Henry P. Sartorio; John P. Wooldridge

[57] ABSTRACT

The viewers' perception of laser speckle in a laser-scanned image projection system is modified or eliminated by the addition of an optical deflection system that effectively presents a new speckle realization at each point on the viewing screen to each viewer for every scan across the field. The speckle averaging is accomplished without introduction of spurious imaging artifacts.

35 Claims, 3 Drawing Sheets

SPECKLE AVERAGING SYSTEM FOR LASER RASTER-SCAN IMAGE PROJECTION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to systems for laser image projection, and more specifically, it relates to a laser speckle averaging system for preserving the depth of focus inherent in a laser image projection system.

2. Description of Related Art

When viewers watch an image generated by the raster scanning of laser light, stationary portions of the image show the detrimental effect of speckle. This is a perceived random alteration of dark and bright fields in an area where uniform brightness is desirable. The speckle pattern can be traced to the rough surface of the diffuse reflecting screen, the long coherence length of the laser, the viewing geometry, and the characteristics of the viewer's eye. It is well known that the effects of speckle can be eliminated by use of the superpositioning of multiple, independent speckle intensity patterns. It would be beneficial if this could be done in a way that does not introduce spurious viewing effects and preserves, in part, the large depth of focus inherent in a laser image projection system.

The speckle observed by a human viewer is generally termed "subjective" speckle since it forms in the imaging plane of a lens (here the lens of the viewer's eye). This subjective speckle pattern can nevertheless be directly related to an "objective" speckle pattern formed at the entrance aperture of the viewer's eye (i.e. near the iris). If two or more uncorrelated objective speckle patterns are formed at the iris in succession, then similarly, the same number of uncorrelated speckle patterns are formed on the viewer's retina. The superpositioning of such uncorrelated patterns tends to smooth out the dark-light patterning of the speckle field.

It has been shown that the speckle pattern formed by a surface rotates with that surface when that surface is rotated under incident laser illumination. Further, one can describe the rough surface giving rise to the speckle pattern as a combination of many randomly oriented gratings with random spacings and periods. Since the grating equation only deals with the relative angles of the surface normal and the incident and reflected light, a similar rotation of the speckle pattern can be achieved by keeping the surface fixed while rotating the incident illumination direction. Using the principle that rotation of the speckle pattern can be achieved by keeping the surface fixed while rotating the incident illumination direction, and the fact that the rotated speckle pattern tends to decorrelate with increasing angle of rotation, has given rise to a method for measuring surface roughness and has also given rise to a device for measuring the surface roughness in real time.

SUMMARY OF THE INVENTION

It is an object of the present invention to eliminate the effects of laser speckle from a laser projection system while preserving the depth of focus of the system without introducing spurious viewing effects.

The viewers' perception of speckle from a laser-generated image projection system is modified or eliminated by the addition of an optical deflection system that effectively presents a new speckle realization at each point on the viewing screen to each viewer for every scan across the field. The speckle averaging is accomplished without introduction of spurious imaging artifacts.

In the present invention, uncorrelated speckle patterns are successively presented to the viewer's iris by rotating the illumination angle of incidence of the projected beam about the nominal projection direction. The position of the projected image remains firmly fixed. This action equivalently presents uncorrelated speckle patterns on the viewer's retina. The azimuthal rotation achieves a maximum number of uncorrelated speckle fields for a minimum deflection in the angle of incidence. The uncorrelated speckle patterns average over the retinal response time to reduce the perceived speckle induced intensity fluctuations.

One moving mirror and one stationary conical optic are utilized to select different incident angles. The moving mirror doubles as the focusing element and can be activated by an automatic focusing device. Because only the angle of incidence changes in the projection, the projected picture is stationary on the screen. Therefore, this device will average out the speckle without causing any discernible image position fluctuations.

DETAILED DESCRIPTION OF THE INVENTION

Figure 1:
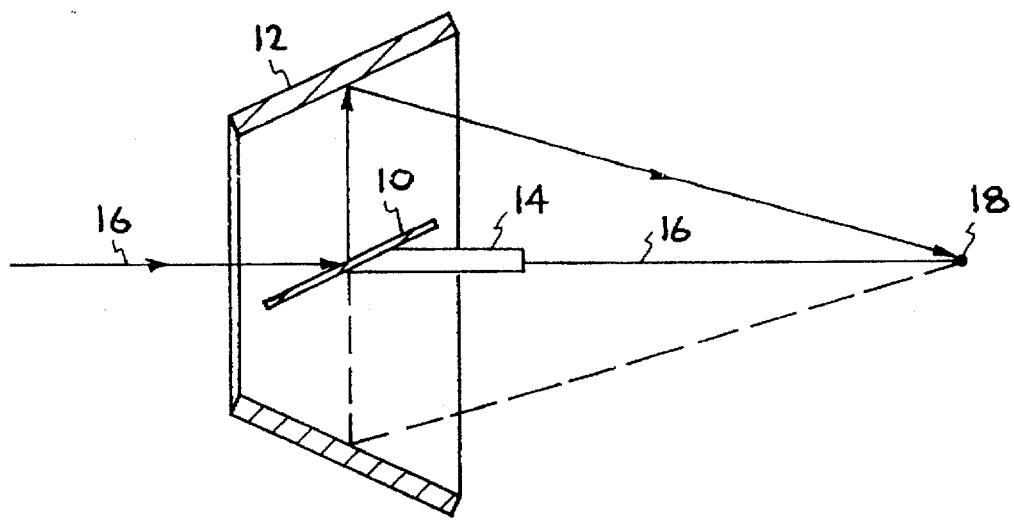
FIG. 1 shows the offset projection angle in a plane section through a conical optic.
Figure 3:
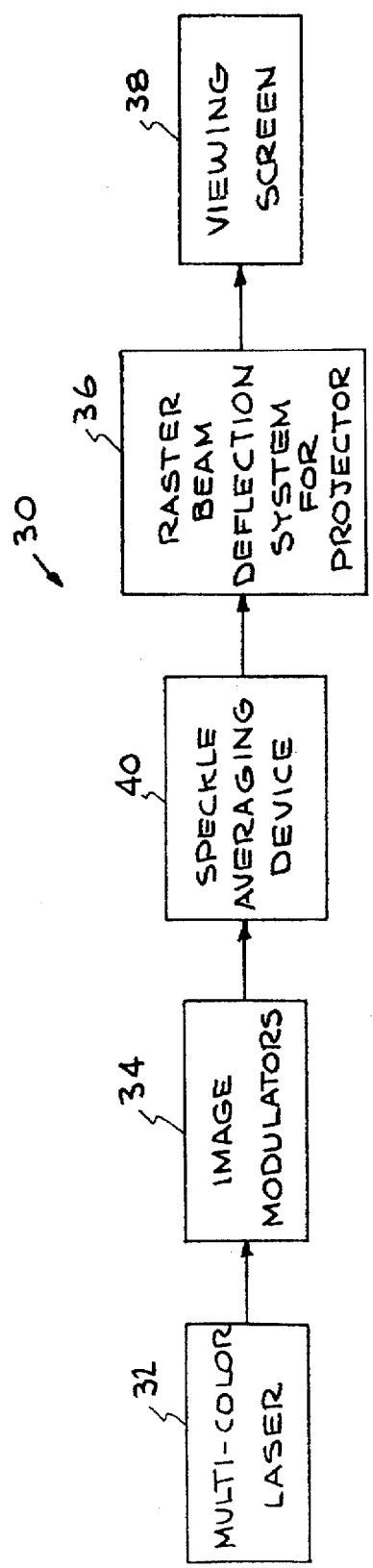
FIG. 3 is a system block diagram showing the stages of a laser image projection system with the speckle averaging device.
Figure 4:
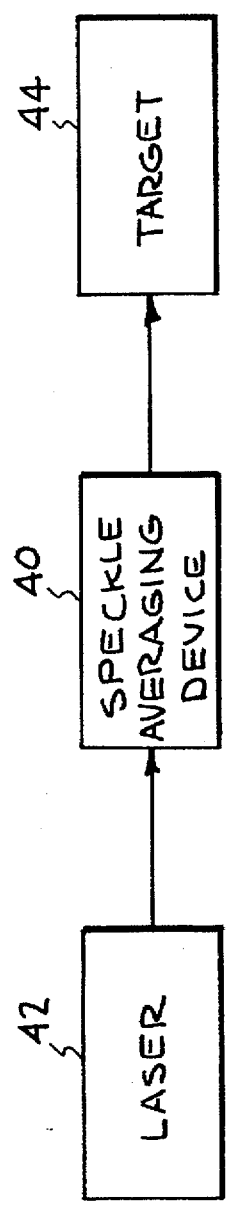
FIG. 4 shows the use of a speckle averaging system in a long range target tracking device.

The speckle averaging device described herein is utilized as an integral part of a raster scanning laser image projection system; but it is not constrained only to this one application. The basic hardware of the speckle averaging device is shown diagramatically in FIG. 1. The main components are an axial mirror 10 and a conic section mirror 12. Axial mirror 10 consists of a single or multisectional mirror mounted on a spindle 14. The optical axis 16 of the device is collinear with the spindle axis. The axis of the conic section mirror 12 is also collinear with the spindle axis. A multicolor (nominally red, green, and blue) projection beam on optical axis 16 will be reflected by axial mirror 10. The incident beam direction is collinear with the spindle axis. In operation, the incident projection beam is deflected outward by the axial mirror 10 to the conical section 12, which brings it to convergence at point 18 where a screen or back projection surface of the projector may be located. Point 18 may be preceded by a beam raster deflection system and other relay optics as shown in FIG. 3. The deflection of the projection beam provided by the axial mirror 10 and the conic section 12 serves to give an offset direction to the incident beam. When the axial mirror 10 is rotated one full revolution about the spindle axis, the offset direction is swept in a circle around the nominal projection direction and a full average over the speckle effect is obtained. The rate of rotation of the axial mirror is a minimum of 10 Hz and a maximum of many multiples of the frame rate of the projection device, except that the rotation should not be synchronous with any integer multiple of the frame rate.

Figure 2:
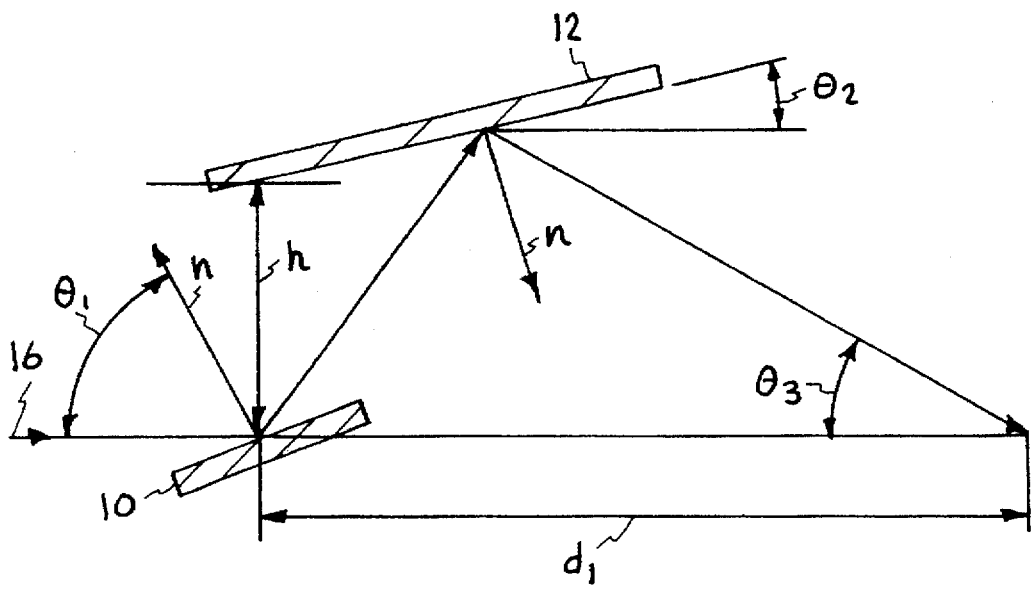
FIG. 2 shows a plane section through the device.

The distance of the convergence point 18 from the axial mirror 10 can be selected by changing the tilt of the axial mirror 10 or shifting its axial position slightly with respect to the conic optic section 12. The conic section mirror 12 may be a plane conic section or a more general conic section with curvature along the axial direction. This curvature may beneficially be utilized to taylor the dependence of the beam convergence position on the axial location or tilt of mirror 10. For example, with the angles defined as shown in the cross section of the device in FIG. 2, and with the conic section mirror 12 comprising a plane conic section, the image distance $d_i$ is given by $$d_i = \left( \frac{-h}{\tan(\theta_2) + \cot(\theta_2)} \right) \left( 1 + \frac{\tan(2\theta_1)}{|\tan\theta_3|} \right) \quad (1)$$

where $\theta_1$ is the angle of incidence of the projection beam on mirror 10, h is defined as the distance from the axial mirror 10 to the conic optic 12 when h is perpendicular with optical axis 16, $\theta_2$ is the angle of mirror section 12 with respect to optical axis 16 and $\theta_3$ is the angle of the projection beam with respect to the optical axis 16. By changing the tilt of mirror 1, thereby changing $\theta_1$ the distance $d_i$ to the convergence point can be changed. The distance to the convergence point can also be changed by sliding the axial mirror along the spindle axis. If $\Delta x$ represents the shift along the axis of the axial mirror, then the distance to the convergence point changes from $d_{i0}$ to $d_i$ according to $$d_i = d_{i0} \left( 1 + \frac{\Delta x}{h_0} \tan\theta_2 \right) + \Delta x \quad (2)$$

where $h_0$ is the initial perpendicular height to the plane conical mirror section from the axial mirror.

Focusing of the device is essentially the same as adjusting the convergence point to fall on the object screen or projection surface. Focusing may therefore be accomplished via modification of the tilt of mirror 10 or the position of this mirror along the spindle axis or both. In operation, one can realize N uncorrelated speckle realization for each full rotation of the axial mirror. Due to the continuous nature of the reflected beam off the conical optic an infinite number of speckle views are presented for each full rotation of the axial mirror; but only N of these views are uncorrelated. For an observer looking at a reflective screen, N is given by $$N = \frac{\pi}{\sin^{-1}\left( \frac{1}{1 + (\eta - 1)\left( \frac{\cos\theta_i}{\cos\theta_r} \right)} \right)} \quad (3)$$

where $\eta$ represents the multiplier above the minimum deflection angle and $\theta_i$ represents the incident angle of the nominal projection direction (with raster scan addition) on the screen and $\theta_r$ represents the angle of reflection off the screen that the nominal projection ray would make as it travels to the observer's pupil. The minimum deflection angle for any speckle averaging with this method depends somewhat on the characteristics of the eyes of the viewer, on the lighting conditions, and on the projection distance. For a person with average optical acuity the minimum deflection angle ranges from 66 μr for a brightly-lit field at a distance of 100 ft to 14 mr for a dimly-lit field at a distance of 2 ft. When $\eta$ equals 1 (its minimum value), equation (3) gives N=2; only two fully uncorrelated speckle realizations are obtained with the minimum deflection angle. For the nominal incidence and reflection angles close to zero and the multiplier $\eta$ much larger than 1, equation (3) simplifies to N≅πη. To obtain a larger number of speckle realizations for a single viewing point the value of $\eta$ may be incremented by unit values (by changing the tilt and position of the axial mirror) for each full rotation of the axial mirror.

As shown in the system flow diagram of FIG. 3, the speckle averaging device is utilized as part of a laser image projection system 30 which conventionally has a multi-color laser 32, image modulators 34, a raster beam deflection system 36 and a viewing screen 38. In this embodiment, a speckle averaging device 40 is placed between image modulators 34 and the raster beam deflection system 36. Speckle averaging device 40 may include an automatic focus control. Viewing screen 38 may be a reflecting screen or a diffusing screen. Viewing screen 38 may additionally include or alternately be an electronic observer or machine vision device. The raster pattern of the projector is imposed on the beam after the speckle averager and before the beam is incident on the viewing screen. The raster pattern can be driven by a pair of plain mirrors or a similar device that deflects the projection beam in yaw and in pitch. During the raster scan, the axial mirror position or axial mirror tilt is controlled to maintain the convergence point on the projection surface for all points on the viewing screen.

Figure 5:
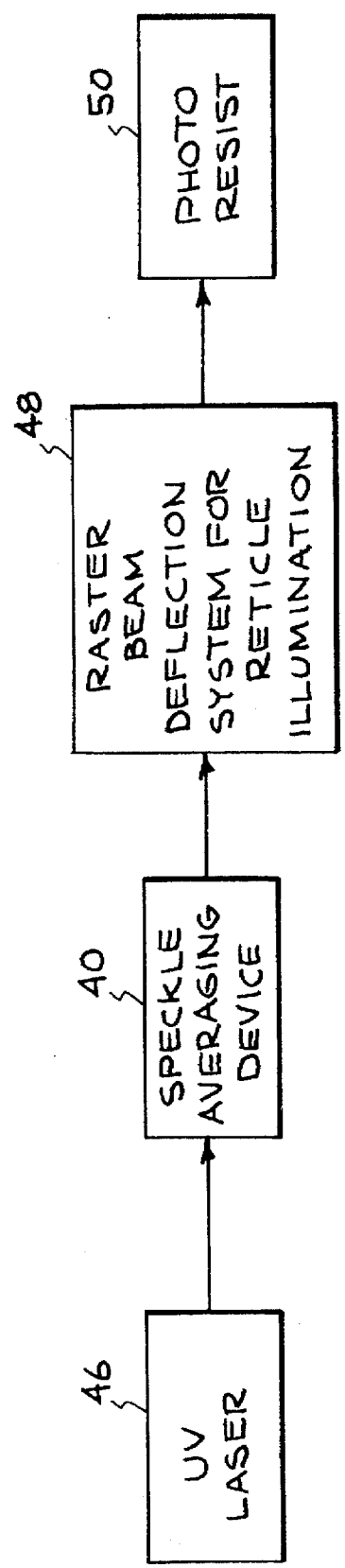
FIG. 5 shows the use of a speckle averaging system for reticle illumination onto a photo resist.

The apparatus described herein may be used in a method for reducing the speckle observed in an image formed by laser illumination where the speckle field propagating from an object point is rotated about an optic axis located between the object point and an image point. Multiple uncorrelated fields are thus averaged to give a smooth intensity at the image point, which may be viewed from a sceen such as a reflecting or transmitting screen. The image may be a laser projection image from a laser projector. If the image is directed to a single spot and held stationary for a period of time, the image point will appear stationary. Electronic observers and machine vision devices may be used to view the image. Visible wavelengths and infrared wavelengths are useable to form the image. The beam propagating from the object may be modulated. This invention may include a long-range target tracking device having laser 42, speckle averaging device 40 and target 44. In microlithography, ultraviolet laser illumination is directed onto a reticle which is imaged onto a photo resist to reduce the effects of speckle. FIG. 5 shows a system having a UV laser 46, speckle averaging device 4, raster beam deflection system for reticle illumination 48 and photo resist 50. In some cases, it may be beneficial to adjust the axial position of an axial mirror to control the focus of the speckle field at the image point. By adjusting the tilt of an axial mirror, the focus of the speckle field at the image point may be controlled. The method may include automatically controlling the focus of the speckle field at the image point where precomputed projection distances across a viewing screen are fed forward to an axial mirror controller and synchronized with the raster scan of a laser image projector.

The speckle averaging device and method described herein may be applied at any one wavelength or a set of multiple wavelengths for which good reflection from a mirror can be obtained and which forms an image on a detector's focal plane. In particular, visible wavelengths are employed in the laser projection of color images to be viewed by human observers. The method may also be applied for reduction of speckle on focal planes comprising electronic detectors both in the visible and in the infrared. In the visible the method can be utilized in the laser illumination of objects viewed by robot observers such as in automated manufacturing. The reduction of speckle here aids in simplifying the image processing utilized in machine vision. At infrared laser wavelengths the method may be employed in long-range target illumination for automatic tracking purposes. Here the averaging over speckle aids in obtaining a solid tracking lock on the targeted object. Specifically for such long-range tracking applications, the observer's entrance aperture may be positioned directly in front of the axial mirror (between the axial mirror and the illuminated object) and the entrance aperture (such as a telescope) may span the whole area inside the reflection points off the conic section. The method may also be applied in the ultra violet as an aid in speckle reduction in lithography.

Changes and modifications in the specifically described embodiments can be carried out without departing from the scope of the invention, which is intended to be limited by the scope of the appended claims.

We claim:

1. A method for reducing the speckle observed in an image formed by laser illumination, comprising rotating the speckle field created at an object point, wherein said speckle field is rotated about an optic axis located between said object point and an image point, wherein multiple uncorrelated fields are averaged to give a smooth intensity at said image point, said method further comprising the step of adjusting the axial position of an axial mirror to control the focus of said speckle field at said image point.

2. The method of claim 1, further comprising the step of viewing said image point from a screen, wherein said image comprises a laser projection image from a laser projector, wherein said screen is selected from a group consisting of a reflecting screen and a transmitting screen.

3. The method of claim 1, further comprising the step of making said image point appear stationary.

4. The method of claim 1, further comprising the step of viewing said image with viewers selected from a group consisting of electronic observers and machine vision devices, wherein said image comprises a laser projection image from a laser projector, wherein said laser projector projects at least one beam having at least one wavelength, wherein said at least one wavelength is selected from a group consisting of visible wavelengths and infrared wavelengths.

5. The method of claim 3, further comprising the step of modulating said at least one beam.

6. The method of claim 1, wherein the step of rotating the speckle field from an observed object point includes rotating the speckle from an observed target point about an observer pupil's optic axis wherein multiple uncorrelated fields are averaged to give a smooth intensity at an image point, wherein said observer pupil's optic axis comprises a long-range target tracking device.

7. The method of claim 5, further comprising the step of directing ultraviolet laser illumination onto a reticle which is imaged onto a photo resist, wherein the effects of speckle in microlithography are reduced.

8. The method of claim 1, further comprising the step of adjusting the tilt of an axial mirror to control the focus of said speckle field at said image point.

9. The method of claim 1, further comprising the step of automatically controlling the focus of said speckle field at said image point, wherein precomputed projection distances across a viewing screen are fed forward to an axial mirror controller and synchronized with a raster scan of a laser image projector.

10. An apparatus for speckle averaging, comprising:

a conical mirror section;

a rotatable axial mirror for deflecting a nominal beam direction off said conical mirror section, wherein a projected beam is given an angular offset that is swept over said nominal beam's azimuth to induce speckle fields to rotate about the optic axis of an observer's pupil.

11. The apparatus of claim 10, further comprising a laser projection system.

12. An apparatus for speckle averaging, comprising:

a conical mirror section;

means for deflecting an incident beam outward to said conical mirror section, said conical mirror section producing a projected beam, said conical section directing said projected beam to a convergence point.

13. The apparatus of claim 12, wherein said means for deflecting an incident beam comprise an axial mirror, wherein said axial mirror comprises a spindle having a central axis of rotation, wherein said axial mirror is rotatable.

14. The apparatus of claim 13, wherein said axial mirror is selected from a group consisting of a single mirror and a multisectional mirror.

15. The apparatus of claim 14, wherein said apparatus, said conical mirror section and said incident beam each comprise an optical axis that is collinear with said central axis of rotation of said spindle.

16. The apparatus of claim 15, further comprising means for viewing said projected beam at said convergence point.

17. The apparatus of claim 16, wherein said viewing means comprise a screen is selected from a group consisting of a reflecting screen and a transmitting screen.

18. The apparatus of claim 17, wherein said axial mirror comprises a tilt with respect to said optical axis of said apparatus, wherein the distance of said convergence point from said axial mirror is adjusted by changing said tilt of said axial mirror.

19. The apparatus of claim 17, wherein said axial mirror comprises a tilt with respect to said optical axis of said apparatus, wherein the distance of said convergence point from said axial mirror is adjusted by shifting the position of said axial mirror along said optical axis of said apparatus.

20. The apparatus of claim 17, wherein said conical mirror section is selected from a group consisting of a plane conical section and a general conical section, wherein said conical section comprises a curvature along said optical axis of said apparatus.

21. The apparatus of claim 20, wherein said apparatus comprises an image distance $d_i$ from said axial mirror to said convergence point, wherein said image distance $d_i$ is given by $$d_i = \left( \frac{-h}{\tan(\theta_2) + \cot(\theta_2)} \right) \left( 1 + \frac{\tan(2\theta_1)}{|\tan\theta_3|} \right)$$

where $\theta_1$ is the angle of incidence of said incident beam on said axial mirror, h is the distance from said axial mirror to said conical mirror section when h is perpendicular to said optical axis, $\theta_2$ is the angle of said conical mirror section with respect to said optical axis and $\theta_3$ is the angle of said projected beam with respect to said optical axis.

22. The apparatus of claim 20, wherein the distance from said axial mirror to said convergence point is determined by $$d_i = d_{i0}\left(1 + \frac{\Delta x}{h_0}\tan\theta_2\right) + \Delta x$$

where $d_{i0}$ is the original distance of said axial mirror to said convergence point, $\Delta x$ represents the shift of said axial mirror along said optical axis, $h_0$ is the initial perpendicular height to said conical mirror section from said axial mirror and $\theta_2$ is the angle of said conical mirror section with respect to said optical axis.

23. The apparatus of claim 17, where the number of speckle realizations N is determined by $$N = \frac{\pi}{\sin^{-1}\left(\frac{1}{1+(\eta-1)\left(\frac{\cos\theta_i}{\cos\theta_r}\right)}\right)}$$

where $\eta$ represents a multiplier above a minimum deflection angle, $\theta_i$ represents the incident angle of a nominal projection direction of said projected beam (with raster scan addition) on a screen and $\theta_r$ represents the angle of reflection off said screen that a nominal projection ray of said projected beam would make as it travels to an observer's pupil.

24. An improved laser image projection system including:
a multi-color laser; image modulators for modulating light from said multi-color laser; a raster beam deflection system for rastering said light; and a viewing screen, the improvement comprising an apparatus for speckle averaging, comprising:
a conical mirror section; and
a rotatable axial mirror for outwardly deflecting an incident beam from said image modulators to said conical mirror section, said conical mirror section producing a projected beam, said conical section directing said projected beam to a convergence point on said viewing screen.

25. An apparatus for speckle averaging, comprising:
means for rotatably deflecting an object beam around the optical axis of said object beam to produce a deflected beam; and
means for producing a projected beam, wherein the speckle field from an object point is rotated about an optic axis extending from said object point to an image point, wherein multiple uncorrelated fields are averaged to give a smooth intensity at said image point.

26. A method for reducing the speckle observed in an image formed by line-by-line raster scanning laser illumination, comprising:
rotating the speckle on a point by point basis in the image plane, wherein said speckle is generated on a point by point basis at the object plane and wherein the laser beam formed by said laser illumination is rotated about the nominal scan direction causing a related rotation of the speckle field in the image plane about an instantaneous optic axis located between the image point and its corresponding raster scanned object point and wherein multiple uncorrelated speckle fields are averaged at the image point to give a smooth intensity at said image point.

27. A method for reducing the speckle observed in an image formed by laser illumination, comprising rotating the speckle field created at an object point, wherein said speckle field is rotated about an optic axis located between said object point and an image point, wherein multiple uncorrelated fields are averaged to give a smooth intensity at said image point, said method further comprising the step of adjusting the tilt of an axial mirror to control the focus of said speckle field at said image point.

28. The method of claim 27, further comprising the step of viewing said image point from a screen, wherein said image comprises a laser projection image from a laser projector, wherein said screen is selected from a group consisting of a reflecting screen and a transmitting screen.

29. The method of claim 27, further comprising the step of making said image point appear stationary.

30. The method of claim 27, further comprising the step of viewing said image with viewers selected from a group consisting of electronic observers and machine vision devices, wherein said image comprises a laser projection image from a laser projector, wherein said laser projector projects at least one beam having at least one wavelength, wherein said at least one wavelength is selected from a group consisting of visible wavelengths and infrared wavelengths.

31. The method of claim 29, further comprising the step of modulating said at least one beam.

32. The method of claim 27, wherein the step of rotating the speckle field from an observed object point includes rotating the speckle from an observed target point about an observer pupil's optic axis wherein multiple uncorrelated fields are averaged to give a smooth intensity at an image point, wherein said observer pupil's optic axis comprises a long-range target tracking device.

33. The method of claim 31, further comprising the step of directing ultraviolet laser illumination onto a reticle which is imaged onto a photo resist, wherein the effects of speckle in microlithography are reduced.

34. The method of claim 27, further comprising the step of adjusting the axial position of an axial mirror to control the focus of said speckle field at said image point.

35. The method of claim 27, further comprising the step of automatically controlling the focus of said speckle field at said image point, wherein precomputed projection distances across a viewing screen are fed forward to an axial mirror controller and synchronized with the raster scan of a laser image projector.

* * * * *